United States Patent Office 2,846,423
Patented Aug. 5, 1958

2,846,423

PROCESS FOR IMPROVING POLYMERS OF ACRYLONITRILE

Adolf Hartmann, Gessertshausen, near Augsburg, Germany, assignor to Farbwerke Hoechst Aktiengesellschaft vormals Meister Lucius & Bruning, Frankfurt am Main, Germany, a corporation of Germany No Drawing. Application August 15, 1955
Serial No. 528,546

11 Claims. (Cl. 260—85.5)

The present invention relates to a process for improving polymers of acrylonitrile.

Shaped structures, such as fibers, threads and ribbons from polymers or copolymers of acrylonitrile which contain components carrying basic groups, do not meet the requirements as regards their fastness to heat. This drawback, sometimes, restricts the use of these products which, owing to their favorable tinctorial properties are particularly valuable. At an elevated temperature the insufficient thermal stability of these products gives rise to a discoloration and a reduction in strength of the shaped structures. Moreover, there is the risk that the material becomes glossy on ironing.

Now I have found that macromolecular compounds of acrylonitrile containing basic groups can be improved by treating them with hydrofluoboric acid or with the water-soluble salts thereof.

When treating shaped structures of the kind described above according to this invention, the resistance to heat is essentially increased. It is understood that the polymers containing basic groups can be treated before or after the shaping process since the desired effect depends solely on the reaction of the macromolecules with the hydrofluoboric acid or the salts thereof. Thus, for example, the basic polymeric spinning raw materials may be pretreated, advantageously in a finely dispersed form, with an aqueous solution of hydrofluoboric acid or, alternatively, the acid may be incorporated into the masses to be shaped in the form of a soluble salt, for example an amine salt. Generally, however, pre-shaped structures into which the basic groups, if desired, may have subsequently been incorporated, are after-treated using an aqueous solution of hydrofluoboric acid or, if desired, a salt thereof. Salts with volatile bases have the same effect as the acids, provided the bases can volatize in the course of the treatment, as for example ammonia. Salts, particularly alkali metal salts, are used with special advantage when the anions attached to the basic groups can be replaced by the anion of the hydrofluoboric acid. It is advisable to conduct the treatment with an aqueous solution at an elevated temperature, for example at a temperature of 50–115° C., preferably at 85–95° C. and, if desired, with application of pressure. If the treatment is conducted at a temperature exceeding 100° C., the treatment with an aqueous solution must be effected with application of pressure, preferably at a pressure of 2–3 atmospheres (gauge pressure), which pressure is formed at a temperature of about 110° C. The concentration of the aqueous solutions used may vary within wide limits. It is, however, of advantage to use a solution of 1–5 percent strength in a ratio of fiber to liquor of about 1:40. After a sufficiently long duration of action, for example 5–30 minutes, the material is rinsed with water and then dried. The effect is well preserved during this rinsing process, especially when the treatment is conducted with application of pressure. The plastics or structures on the basis of acrylonitrile which may be treated by the process of this invention may consist of copolymers alone or mixtures of polymers, for example copolymers of acrylonitrile containing basic groups and homopolymers of acrylonitrile, in both cases the polymers containing basic salt forming groups.

The copolymers may contain incorporated into their structure the following basic components: 2-vinylpyridine, N-vinylimidazole, basic vinyl ethers, such as $\beta$-morpholino- or $\beta$-dimethyl-amino-ethyl vinyl ether, components carrying ester or amide groups with basic nitrogen, for example acrylic acid-$\beta$-di-methylamino-ethyl ester, methacrylic acid-$\beta$-morpholino-ethyl ester, acrylic acid - N - gamma-piperidino-propyl amide and fumaric acid-bis-$\beta$-dimethylamino-ethyl ester. In the basic polymers the nitrogen atom may also be present in a quaternary form, the quaternization being effected, for example by means of dimethyl sulfate or methyl bromide. The basic groups may also be introduced into the molecule of the polymer or into the fiber by treating, before or after the shaping process, acrylonitrile copolymers substituted by reactive halogen, with aminating agents. There may be used for example reaction products of copolymers of the acrylonitrile with vinylchloracetate, allylchloracetate, methallylchloracetate, vinyl bromide, methacrylic acid-$\beta$-chlorethyl ester, acrylic acid-gamma-bromopropyl amide or vinyl-$\beta$-chlorethyl ether, and amines such as trimethylamine, morpholine, cyclohexylamine, hexamethylene tetramine or other substances of basic action, such as compounds of thiourea, for example, ethylene thiourea. In the latter case the treatment of the shaped structures according to this invention can be conducted simultaneously with the action of a thiourea.

The absorptive power of the treating agent is favorably influenced if the polymeric material contains in addition to the basic groups hydrophilic components, such as vinyl acetate, allyl alcohol, acrylic acid amide, or methacrylic acid ethanol amide.

The treatment according to this invention may, if desired, be combined with a fixing, a crimping or a dyeing process using dyestuffs containing acid groups. It is understood that the treatment may be repeated, for example, after completion of the dyeing process.

Structures which have been treated by the process of this invention show, at an elevated temperature, especially at a temperature exceding 150° C., an essentially inferior tendency to discoloration and an essentially inferior loss in strength and, likewise, have but a slight tendency to become glossy on ironing. Their properties and tinctorial power are not impaired.

The following examples serve to illustrate the invention, but they are not intended to limit it thereto, the parts being by weight:

*Example 1*

Threads having a titer of 90 deniers and prepared according to the dry-spinning process from a copolymer consisting of 97 parts of acrylonitrile and 3 parts of acrylic acid-$\beta$-dimethylamino-ethyl ether, and quaternized with dimethyl sulfate are treated for 20 minutes, at a temperature of 90° C., with a 2 percent aqueous solution of hydrofluoboric acid; the threads are then thoroughly rinsed with water and dried. The threads so treated practically do not fade when being ironed at temperatures of up to 180° C. and even at a temperature of 200° C. assume only a slight yellow discoloration, whereas an untreated sample turns slightly yellow already at a temperature of 130° C. The strength of the treated and heated fiber, likewise, is essentially improved.

Example 2

A copolymer consisting of 93 percent of acrylonitrile and 7 percent of vinyl-β-chlorethyl ether is spun from a solution of 24 percent strength of dimethylformamide, the threads are stretched and then treated, for 45 minutes, at a temperature of 98° C., with a 10 percent aqueous solution of morpholine. After thorough rinsing with water, the material is strongly squeezed off and then treated for about 15 minutes in a pressure vessel at a temperature of 105° C. with a 2 percent aqueous solution of hydrofluoboric acid. The material is rinsed again with water and dried. The threads so treated do not fade when being ironed at temperatures of up to 180° C. and even at a temperature of 200° C. assume only a slight discoloration, whereas an untreated sample turns yellow at a temperature of 140° C. When being dyed for 90 minutes at the boil with 3 percent of Alizarian Sky Blue FFB (calculated on the fiber), the affinity for the dyestuffs amounts in the first case to 10.8 percent and in the second case to 9.5 percent.

Example 3

A fiber prepared from a copolymer consisting of 90 percent of acrylonitrile and 10 percent of vinyl-β-chlorethyl ether, is treated for 30 minutes at a temperature of 100° C. with a 10 percent aqueous solution of morpholine. The material is then thoroughly rinsed with water, acidified at a temperature of 70° C. with sulfuric acid of 2 percent strength, rinsed again and dried. When being ironed with a flat iron heated to 170° C., the fiber assumes a yellowish discoloration. If the fiber is pretreated for 15 minutes at a temperature of 90° C. with a 5 percent aqueous solution of the ammonium salt of hydrofluoboric acid, rinsed with water and dried, the discoloration on ironing under the same conditions is essentially reduced. As compared with non-ironed material, the fiber has only a slightly beige shade.

Example 4

A copolymer prepared from 90 parts of acrylonitrile and 10 parts of methacrylic acid-β-dimethylamino-ethyl ester is treated, for 10 minutes, at 90° C., while stirring and in a goods-to-liquor ratio of 1:10 with a 2 percent aqueous solution of hydrofluoboric acid; the solution is then filtered off with suction, the material is washed with cold water and dried. 22 parts of the product so obtained are dissolved in 78 parts of dimethylformamide and the solution so obtained is made into a film which after drying is stretched with application of heat in a proportion of 1:4. After having been heated for 15 minutes to 160° C., the film has remained unchanged as regards color and appearance; when heated for 15 minutes at 180° C. it assumes only a slight yellow discoloration.

Contrary thereto, a film made of the same polymer but without pretreatment with hydrofluoboric acid assumes a substantially yellow discoloration when heated to 160° C. and when heated to 180° C. turns brown.

I claim:

1. A process for improving the thermal stability of a solid copolymer of acrylonitrile containing basic nitrogen groups, which comprises contacting the copolymer with an aqueous solution of a member selected from the group consisting of hydrofluoboric acid and water-soluble salts thereof at an elevated temperature.

2. The process of claim 1 wherein the process is carried out at temperatures of from 50 to 115° C.

3. The process of claim 1 wherein the process is carried out at temperatures of from 85 to 95° C.

4. The process as claimed in claim 1 wherein elevated pressure is employed.

5. The process as claimed in claim 4, wherein the pressure is from about 2 to 3 atmospheres gauge.

6. The process as claimed in claim 1, which comprises contacting said macromolecular compound of acrylonitrile before shaping it.

7. The process as claimed in claim 1, which comprises contacting said macromolecular compound of acrylonitrile after shaping it.

8. The process as claimed in claim 1, wherein the solid macromolecular compound is a copolymer of acrylonitrile and an olefinic compound containing basic nitrogen groups.

9. The process of claim 1, wherein the copolymer is a copolymer of acrylonitrile and acrylic acid-β-dimethylamino-ethyl ester quaternized with dimethyl sulfate.

10. The process of claim 1, wherein the copolymer is a copolymer of acrylonitrile and vinyl-β-chloroethylether treated with morpholine.

11. The process of claim 1, wherein the copolymer is a copolymer of acrylonitrile and methacrylic acid-β-dimethylamino-ethyl-ester.

References Cited in the file of this patent
UNITED STATES PATENTS

| | | |
|---|---|---|
| 2,514,132 | Kienle et al. | July 4, 1950 |
| 2,617,783 | Slocombe | Nov. 11, 1952 |